United States Patent [19]

Chow

[11] Patent Number: 4,953,251
[45] Date of Patent: Sep. 4, 1990

[54] WIPER JOINT STRUCTURE

[75] Inventor: Simon S. M. Chow, Toronto, Canada

[73] Assignee: Tridon Limited, Oakville, Canada

[21] Appl. No.: 7,547

[22] Filed: Jan. 28, 1987

[51] Int. Cl.$^5$ .............................................. B60S 1/32
[52] U.S. Cl. ............................... 15/250.32; 15/250.42
[58] Field of Search ........... 15/250.42, 250.31, 250.32; 403/159, 157, 79

[56] References Cited

U.S. PATENT DOCUMENTS

| | | | |
|---|---|---|---|
| 3,179,969 | 4/1965 | Glynn | 15/250.32 |
| 3,935,612 | 2/1976 | Wittwer . | |
| 3,942,212 | 3/1976 | Steger | 15/250.42 |
| 4,224,001 | 9/1980 | Arndt | 15/250.32 |
| 4,300,259 | 11/1981 | Maiocco | 15/250.32 |
| 4,675,934 | 6/1987 | Dai Palù | 15/250.42 |

FOREIGN PATENT DOCUMENTS 2139528 11/1984 United Kingdom .
2174627 11/1986 United Kingdom .

*Primary Examiner*—Harvey C. Hornsby
*Assistant Examiner*—Scott J. Haugland
*Attorney, Agent, or Firm*—Rogers & Scott

[57] ABSTRACT

A pivotal connection for minimizing any lateral movement between pivotally connected longitudinally extending yokes in articulated windshield wipers forming elongate holders whereby wiper blades are connected to wiper arms driven to reciprocate the blades over a windshield.

A preferred embodiment of the pivotal connection comprises an inner portion including a pair of spaced, parallel flanges having at least one pair of free ends and a rigid outer portion for receiving the inner portion. The portions are pivotally connected by means of a pair of inwardly directed pivot stubs located opposite one another and fixed to inner surfaces of the outer portion. The stubs are received in respective apertures provided on the flanges of the inner portion.

During insertion of the inner portion into the outer portion, the flanges are biased toward one another until the pivot stubs snap into engagement with the apertures. Engagement of the stubs into the apertures allows the flanges to return towards a spaced orientation in which outer surfaces of the flanges abut the inner surfaces of the outer portion, thereby minimizing any lateral movement between the inner and outer portions of the joint.

10 Claims, 3 Drawing Sheets

WIPER JOINT STRUCTURE

This invention relates to a pivotal joint for a windshield wiper blade holder, more particularly for an articulated type of windshield wiper blade holder adapted to uniformly distribute pressure applied by a wiper arm over the length of a wiper blade supported by the holder so that the blade is made to conform to a surface of a windshield which characteristically has a curved profile.

Articulated windshield wipers include a plurality of longitudinally extending yokes connected to each other to form an elongate holder for supporting a wiper blade. The yokes are moveable with a wiper arm driven to reciprocate the blade over a windshield and have pivotal joints pivotally connecting them so that pressure applied by the wiper arm is distributed uniformly over the length of the blade. It is desirable to restrict any lateral movement between the yokes which would bring them out of alignment from each other and affect the disposition of the leading edge of the blade which contacts the windshield in use. Such lateral movement is noticeable as an irritating rattling noise emanating from between the component parts of the pivotal joints and in a deterioration of wiper performance. In particular, the blade may not flip over its entire length from one leading edge to another when the wiper arm changes direction and may even show a tendency not to flip at all. Consequently, the windshield is not properly wiped and vision through the windshield is impaired with possibly disastrous results.

An object of this invention is to minimize the rattling resulting from a lateral movement between pivotally connected yokes in articulated windshield wiper blade holders and to improve wiper performance.

According to this invention, there is provided an improved pivotal joint for pivotally connecting the yokes of articulated windshield wipers of the tyupe described above. The joint has two portions, including an inner portion and an outer portion for receiving the inner portion, both portions being pivotally connected to each other. At least one portion is resiliently biased toward the other portion so as to minimize relative lateral movement therebetween in the assembled configuration of the joint.

Preferred embodiments of the invention are described below by way of example only, and with reference to the accompanying drawings in which.

Figure 1:
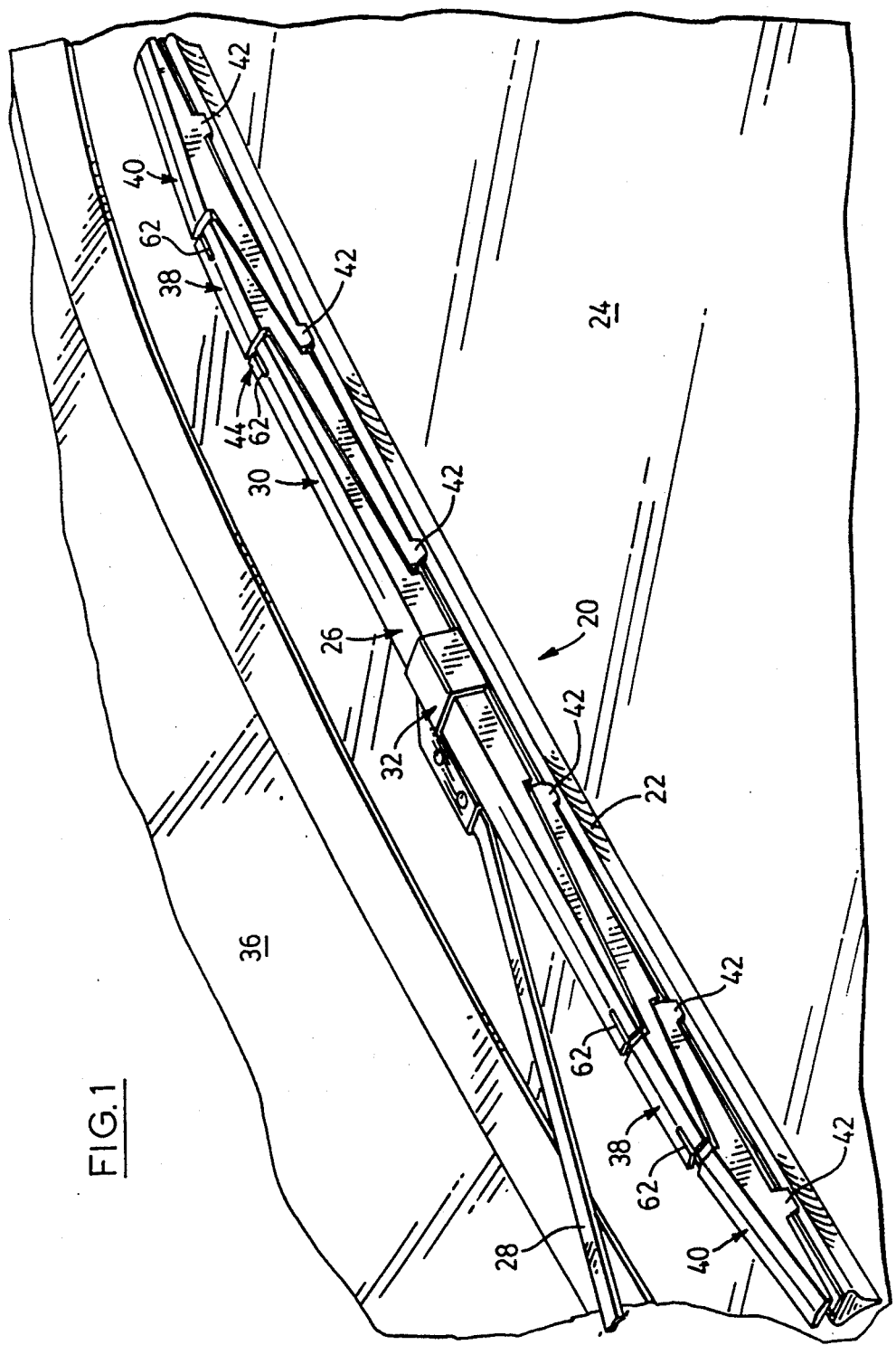
FIG. 1 is a perspective view looking down on a windshield wiper assembly incorporating a blade holder having pivotal joints according to the invention in use and showing part of a conventional wiper arm and a windshield.

Referring firstly to FIG. 1, a windshield wiper is indicated generally by numeral 20 and includes a squeegee or wiper blade 22 which is supported against a windshield 24 by an elongate holder 26 connected to a wiper arm 28.

The arm 28 is driven to move the blade 22 over the windshield 24 by a conventional drive system which may be actuated by a driver through controls usually located on or near the dashboard of a vehicle. A free end of the wiper arm 28 is connected to the center of the holder 26 by attachment means 32. The other end of the arm 28 is pivotally connected to the body of a vehicle and located between the windshield 24 and a vehicle hood 36.

The holder 26 is preferably made from synthetic plastics material and comprises a set of five longitudinally extending yokes pivotally connected to each other to form the holder.

These yokes include a central primary yoke 30, a pair of secondary yokes 38 and a pair of tertiary yokes 40. The secondary yokes 38 are pivotally connected between inner and outer ends to respective outer ends of the primary yoke 30, and the tertiary yokes 40 are pivotally connected between inner and outer ends to the outer ends of respective secondary yokes 38. This arrangement operates in a known manner which will not be described any further.

As mentioned above, the holder 26 is used to support the blade 22 and has integrally moulded claws 42 for slidably receiving the blade. Optional stop members (not shown) may be provided on the tertiary yokes 40 in order to locate the blade 22 relative to the holder 26 and to prevent a sliding movement whereby the blade 22 may be brought out of engagement with the holder 26.

Figure 2:
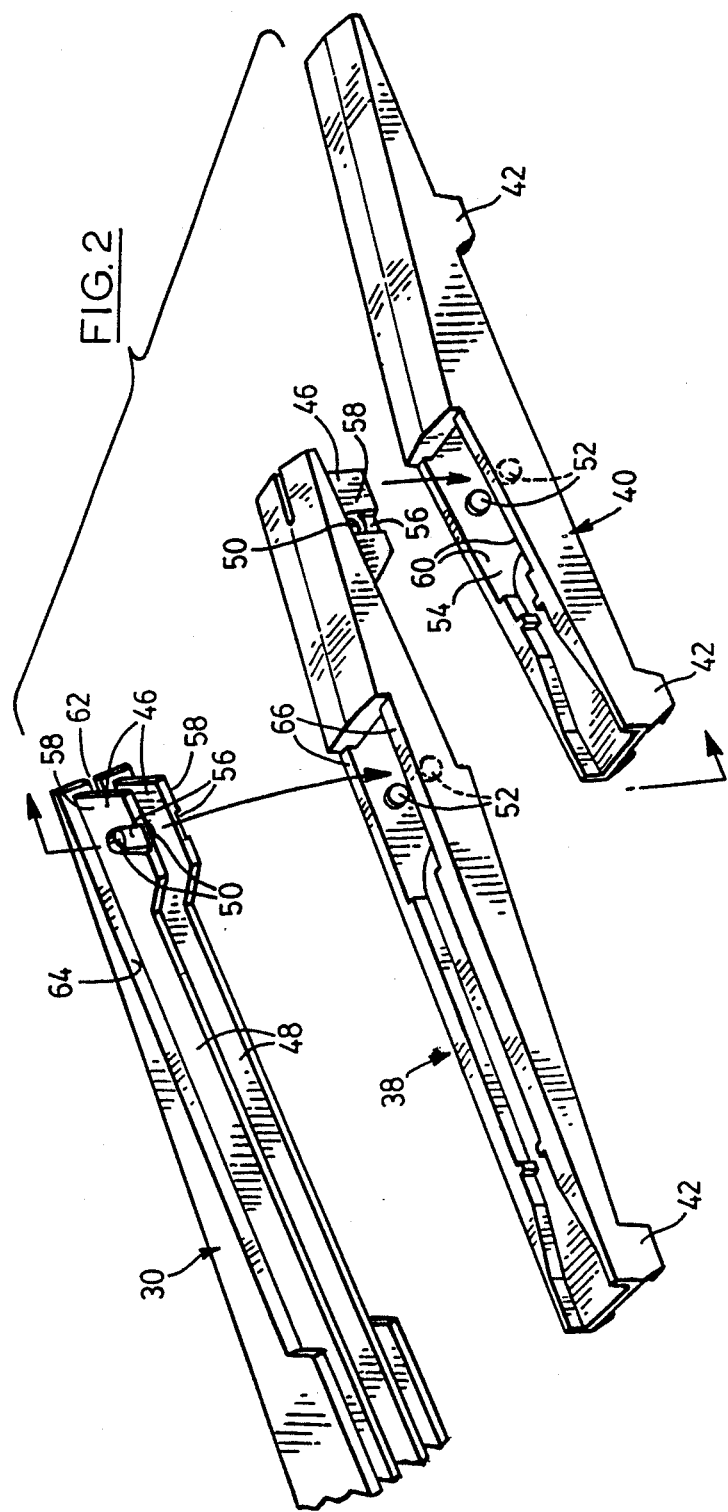
FIG. 2 is an exploded view of a portion of the windshield wiper assembly of FIG. 1 drawn to a larger scale and illustrating the component parts of a pivotal joint according to the invention.
Figure 3:
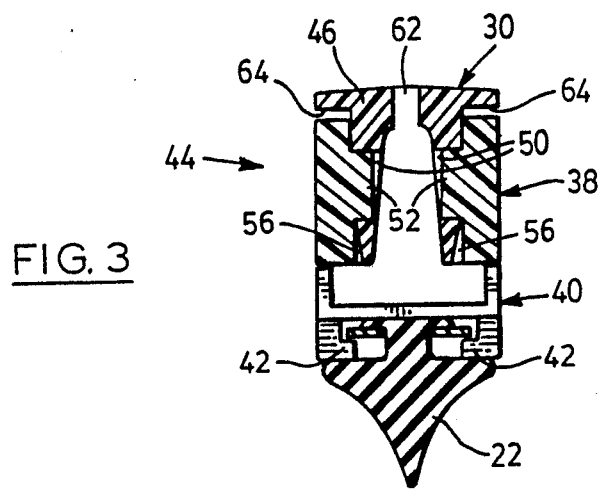
FIG. 3 is a cross-sectional view generally on the line 3—3 of FIG. 2 and drawn to a larger scale.

A pivotal connection for pivotally connecting the primary yoke 30 to one of said secondary yokes 38 is generally indicated by numeral 44 in FIG. 1 and is described below with particular reference to FIGS. 2 and 3. Each outer end of the primary yoke 30 has a pair of spaced parallel flanges 46 extending downwardly (as seen in FIG. 2) and towards the windshield 24. An extended truncated portion of each flange 46 extends from the flanges 46 along a portion of the length of the primary yoke 30 to form ridges 48 which provide some structural rigidity to the underside of the yoke. At the outer end of the primary yoke 30, the space between the flanges 46 is kept open so that they may flex toward one another for engagement into a channel 54 provided between inner and outer ends of said one of secondary yokes 38. A pair of inwardly directed pivot stubs 52 located opposite one another are fixed to inner surfaces 60 of the channel 54. Respective apertures 50 are provided on the flanges 46 and are shaped to receive the stubs 52 in snap fitting co-operation.

The pivotal connection 44 is assembled by sliding the flanges 46 into the channel 54. It will be understood that the flanges 46 are spaced such that operatively outer surfaces 58 are separated by a slightly greater distance than the distance separating the inner surfaces 60 of the channel 54 thereby making it necessary for the flanges 46 to flex toward one another during insertion in the channel 54. Grooves 56 extending downwardly from each aperture 50 (as seen in FIG. 2) and towards the windshield 24 facilitate insertion of the flanges 46 into the channel 54 and guide the pivot stubs 52 into engagement with respective apertures 50.

Returning to FIG. 2, it will be seen that the flanges 46 are recessed from the sides 52 of the primary yoke 30 so that the upper edges of the primary yoke 30 (facing away from the windshield) project over the flanges 46 and define lip portions 64.

In use, pivotal movement of the primary yoke 30 relative to said one of secondary yoke 38 is arrested by the lip portions 64 abutting outer walls 66 defining the channel 54. The lip portions 64 extend from the flanges 46 along a portion of the length of the primary yoke 38 corresponding in length to the portion of the secondary yoke 38 which is adjacent to the primary yoke 30. Said adjacent portions are moulded to have complementary shapes and the selected configuration of these portions is a matter of design choice.

Figure 4:
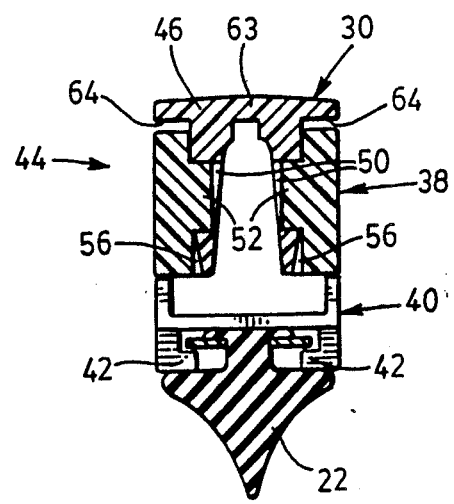
FIG. 4 is a similar view to FIG. 3, illustrating an alternative embodiment of a pivotal joint according to the invention.

A slit 62 continuous with inner surfaces of the flange 46 is provided in the top surface of the outer ends of the primary yoke 30. This slit 62 is adapted to facilitate flexing of the flanges 46 so that they can be brought toward one another during insertion. It will be understood that the synthetic plastics material of the yokes will have the required flexibility and rigidity to provide a snug fit between the flanges 46 and the passage 54. Where the flexibility of the flanges 46 is sufficient, the slit 62 may be dispensed with, such that the wiper blade holder 26 has a closed outer surface 63, as illustrated in FIG. 4, which is not susceptible to clogging due to ice during winter conditions.

Pivotal connections similar to the above described pivotal connection 44 are provided at the other end of the primary yoke 30 and between the secondary yokes 38 and tertiary yokes 40. In the drawings, like parts have been identified by like reference numerals.

In use, it will be understood that the snug pivotal connection 44 provided by the outwardly biased flanges 46 received in channel 54 will considerably minimize any sideways relative movement between yokes and the concomitant disadvantages of rattling and poor wiper performance.

It will further be understood that several variations as may occur to one skilled in the art may be made to the above described embodiment of the invention, without departing from the claimed scope of the invention In particular, pivot stubs may be provided on the flanges of a supporting yoke and apertures for receiving the pivot stub may conversely be provided on a supported yoke. It will also be within the scope of the invention to provide an outwardly biased portion of a hinged connection (corresponding to the flanges of the embodiment described above) in a supported yoke and the rigid receiving portion (corresponding to the channel) in a supporting yoke. Clearly the number and shape of the yokes may also vary considerably.

I claim:

1. In an articulated windshield wiper including a plurality of longitudinally extending yokes pivotally connected to each other to form an elongate holder for supporting a wiper blade, and movable with a wiper arm driven to reciprocate the blade over a windshield in use, at least one pivotal connection being provided for pivotally connecting said yokes, the pivotal connection comprising:
    a resilient outwardly biased inner portion provided on one of said yokes and comprising a pair of spaced parallel flanges;
    a rigid outer portion provided on another of said yokes and adapted to receive the inner portion; and
    hinge means adapted to connect the outer and inner portions comprising a pair of inwardly directed pivot stubs located opposite one another and fixed to inner surfaces of the outer portion, and a corresponding pair of apertures provided on respective flanges of said inner portion, said apertures being adapted to receive the stubs, the inner and outer portions being dimensioned for an interference fit such that insertion of the inner portion into the outer portion biases the flanges towards one another until the pivot stubs snap into engagement with the apertures thereby allowing the flanges to return towards a spaced orientation in which outer surfaces of the flanges are urged into abutment with the inner surfaces of the outer portion such that relative lateral movement between the yokes is minimized to reduce rattling of the wiper upon said reciprocal movement and sufficient pivotal movement at the hinge means is allowed for the articulated wiper to conform to the surface of a curved windshield.

2. A wiper blade holder according to claim 1, in which each flange has a groove extending between the aperture and a free end of the flange to minimize interference in the region of the groove so as to accomodate the stubs and facilitate insertion of the inner portion into the outer portion.

3. A wiper blade holder according to claim 1 wherein the plurality of yokes comprises five yokes and said at least one pivotal connection includes a plurality of pivotal connections,
    said yokes including a central primary yoke having central attachment means for attaching the blade holder to the wiper arm and having at each end one of the inner portions of a first pair of said pivotal connections,
    a pair of secondary yokes pivotally connected to and supported by the primary yoke at respective ends of the primary yoke, each secondary yoke having one of the outer portions of said first pair of pivotal connections, located between its ends, for receiving the inner portion of the pivotal connection of a respective end of the primary yoke, one end of each secondary yoke being remote from the centre of the primary yoke and each secondary yoke having one of the inner portions of a second pair of said pivotal connections at its end remote from the centre of the primary yoke; and
    a pair of tertiary yokes, each tertiary yoke being pivotally connected to and supported by a respective secondary yoke, each tertiary yoke having one of the outer portions of said second pair of said pivotal connections, located between its ends, for receiving a respective one of the inner portions of the second pair of said pivotal connections such that the yokes together form an elongate holder for the blade.

4. A wiper blade holder according to claim 1 in which the inner portion and outer portion are integrally formed with the yokes and the yokes are moulded from synthetic plastics material.

5. An articulated windshield wiper comprising:
    a plurality of longitudinally extending yokes connected to each other to form an elongate holder;
    a wiper blade supported by the holder;
    at least one pivotal connection for pivotally connecting adjacent yokes, the pivotal connection having a resilient outwardly biased inner portion comprising a pair of spaced parallel flanges;
    a rigid outer portion adapted to receive the inner portion; and
    hinge means adapted to connect the outer and inner portions comprising a pair of inwardly directed pivot stubs located opposite one another and fixed to inner surfaces of the outer portion, and a corresponding pair of apertures provided on respective flanges of said inner portion, said apertures being adapted to receive the stubs, the inner and outer portions being dimensioned for an interference fit such that insertion of the inner portion into the outer portion biases the flanges towards one another until the pivot stubs snap into engagement with the apertures thereby allowing the flanges to return towards a spaced orientation in which outer surfaces of the flanges are urged into abutment with the inner surfaces of the outer portion such that relative lateral movement between the yokes is minimized to reduce rattling of the wiper upon said reciprocal movement and sufficient pivotal movement at the hinge means is allowed for the articulated wiper to conform to the surface of a curved windshield.

6. In an articulated windshield wiper including a plurality of longitudinally extending yokes pivotally connected to each other to form an elongate holder for supporting a wiper blade, and movable with a wiper arm driven to reciprocate the blade over a windshield in use, at least one pivotal connection being provided for pivotally connecting said yokes, the pivotal connection comprising:

- a resilient outwardly biased inner portion provided on one of said yokes and comprising a pair of spaced parallel flanges separated by a slit running longitudinally along said one yoke between the flanges to separate the flanges from one another for independent movement;
- a rigid outer portion provided on another of said yokes and adapted to receive the inner portion; and
- hinge means adapted to connect the outer and inner portions comprising a pair of inwardly directed pivot stubs located opposite one another and fixed to inner surfaces of the outer portion, and a corresponding pair of apertures provided on respective flanges of said inner portion, said apertures being adapted to receive the stubs, the inner and outer portions being dimensioned for an interference fit such that insertion of the inner portion into the outer portion biases the flanges towards one another until the pivot stubs snap into engagement with the apertures thereby allowing the flanges to return towards a spaced orientation in which outer surfaces of the flanges are urged into abutment with the inner surfaces of the outer portion such that relative lateral movement between the yokes is minimized to reduce rattling of the wiper upon said reciprocal movement and sufficient pivotal movement at the hinge means is allowed for the articulated wiper to conform to the surface of a curved windshield.

7. Structure as claimed in claim 6 in which each flange has a groove extending between the aperture and a free end of the flange to minimize interference in the region of the groove so as to accomodate the stubs and facilitate insertion of the inner portion into the outer portion.

8. Structure according to claim 6 wherein the plurality of yokes comprises five yokes and said at least one pivotal connection includes a plurality of pivotal connections, said yokes including a central primary yoke having central attachment means for attaching the blade holder to the wiper arm and having at each end one of the inner portions of a first pair of said pivotal connections, a pair of secondary yokes pivotally connected to and supported by the primary yoke at respective ends of the primary yoke, each secondary yoke having one of the outer portions of said first pair of pivotal connections, located between its ends, for receiving the inner portion of the pivotal connection of a respective end of the primary yoke, one end of each secondary yoke being remote from the centre of the primary yoke and each secondary yoke having one of the inner portions of a second pair of said pivotal connections at its end remote from the centre of the primary yoke; and a pair of tertiary yokes, each tertiary yoke being pivotally connected to and supported by a respective secondary yoke, each tertiary yoke having one of the outer portions of said second pair of said pivotal connections, located between its ends, for receiving a respective one of the inner portions of the second pair of pivotal connections such that the yokes together form an elongate holder for the blade.

9. Structure as claimed in claim 6, in which the inner portion and outer portion are integrally formed with the yokes and the yokes are moulded from synthetic plastics material.

10. An articulated windshield wiper comprising:
- a plurality of longitudinally extending yokes connected to each other to form an elongate holder;
- a wiper blade supported by the holder;
- at least one pivotal connection for pivotally connecting adjacent yokes, the pivotal connection having a resilient outwardly biased inner portion comprising a pair of spaced parallel flanges separated by a slit running longitudinally between the flanges to separate the flanges from one another for independent movement;
- a rigid outer portion adapted to receive the inner portion; and
- hinge means adapted to connect the outer and inner portions comprising a pair of inwardly directed pivot stubs located opposite one another and fixed to inner surfaces of the outer portion, and a corresponding pair of apertures provided on respective flanges of said inner portion, said apertures being adapted to receive the stubs, the inner and outer portions being dimensioned for an interference fit such that insertion of the inner portion into the outer portion biases the flanges towards one another until the pivot stubs snap into engagement with the apertures thereby allowing the flanges to return towards a spaced orientation in which outer surfaces of the flanges are urged into abutment with the inner surfaces of the outer portion such that relative lateral movement between the yokes is minimized to reduce rattling of the wiper upon said reciprocal movement and sufficient pivotal movement at the hinge means is allowed for the articulated wiper to conform to the surface of a curved windshield.

* * * * *